(12) United States Patent
Maddever et al.

(10) Patent No.: US 12,083,644 B2
(45) Date of Patent: Sep. 10, 2024

(54) VISION APPARATUS FOR GUARDING A CUTTING BLADE

(71) Applicant: KANDO INNOVATION LIMITED, Auckland (NZ)

(72) Inventors: George Davey Maddever, Auckland (NZ); Keith Blenkinsopp, Auckland (NZ)

(73) Assignee: KANDO INNOVATION LIMITED, Auckland (NZ)

( * ) Notice: Subject to any disclaimer, the term of this patent is extended or adjusted under 35 U.S.C. 154(b) by 0 days.

(21) Appl. No.: 18/558,288

(22) PCT Filed: Jul. 13, 2022

(86) PCT No.: PCT/NZ2022/050094
§ 371 (c)(1),
(2) Date: Oct. 31, 2023

(87) PCT Pub. No.: WO2023/287304
PCT Pub. Date: Jan. 19, 2023

(65) Prior Publication Data
US 2024/0227107 A1 Jul. 11, 2024

(30) Foreign Application Priority Data
Jul. 13, 2021 (NZ) .................................... 778154

(51) Int. Cl.
*B23D 59/00* (2006.01)
*B23Q 17/24* (2006.01)

(52) U.S. Cl.
CPC ....... *B23Q 17/2438* (2013.01); *B23Q 17/249* (2013.01); *B23D 59/001* (2013.01)

(58) Field of Classification Search
CPC . B23Q 17/2438; B23Q 17/249; B23D 59/001
(Continued)

(56) References Cited

U.S. PATENT DOCUMENTS

| 4,271,359 A | 6/1981 | Herwig et al. |
| 6,037,594 A * | 3/2000 | Claytor ................. G01J 5/0022 340/567 |

(Continued)

FOREIGN PATENT DOCUMENTS

WO 2017196187 A1 11/2017

OTHER PUBLICATIONS

International Search Report for PCT/NZ2022/050094 mailed Oct. 17, 2022, 4 pages.
(Continued)

*Primary Examiner* — Omar Flores Sanchez
(74) *Attorney, Agent, or Firm* — NIXON & VANDERHYE

(57) ABSTRACT

Optical imaging apparatus and a machine vision camera system for an alarm protecting a person's hands when working at a motorized cutting or abrading machine, uses trains of sets of mirrors to define four spaced-apart viewpoints and transfer non-overlapping scenes on to an image sensor of a single camera. An optical axis from each viewpoint allows a cuboidal protected volume to be created. The cuboid may have vertical sides. Recognizable objects inside that volume cause the machine to stop, while objects near but outside the volume cause the apparatus to raise an alarm.

10 Claims, 5 Drawing Sheets

(58) Field of Classification Search
USPC .............................................. 83/58
See application file for complete search history.

(56) References Cited

U.S. PATENT DOCUMENTS

| | | | |
|---|---|---|---|
| 7,055,417 B1 | 6/2006 | Gass | |
| 7,875,852 B2 * | 1/2011 | Zhevelev | G01J 5/08 |
| | | | 250/353 |
| 7,924,164 B1 | 4/2011 | Staerzl | |
| 9,188,487 B2 * | 11/2015 | Zhevelev | G08B 13/191 |
| 2006/0101960 A1 * | 5/2006 | Smith | B27G 21/00 |
| | | | 83/58 |
| 2010/0011926 A1 | 1/2010 | Murakami et al. | |
| 2012/0293625 A1 * | 11/2012 | Schneider | F16P 3/142 |
| | | | 348/46 |
| 2013/0201292 A1 * | 8/2013 | Walter | G01V 8/10 |
| | | | 348/46 |
| 2016/0031110 A1 * | 2/2016 | Middleton | B26D 7/01 |
| | | | 83/13 |
| 2017/0252939 A1 | 9/2017 | Blenkinsopp et al. | |
| 2019/0145577 A1 * | 5/2019 | Blenkinsopp | F16P 3/142 |
| | | | 83/58 |
| 2020/0408506 A1 * | 12/2020 | Jacot | B23Q 17/2266 |

OTHER PUBLICATIONS

Written Opinion of the ISA for PCT/NZ2022/050094 mailed Oct. 17, 2022, 4 pages.

* cited by examiner

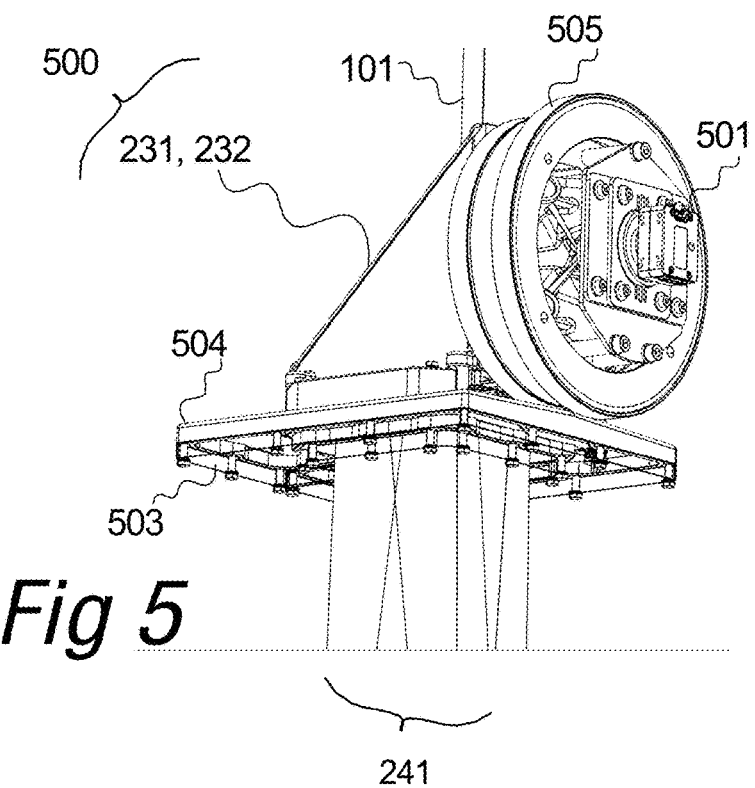
Fig 5
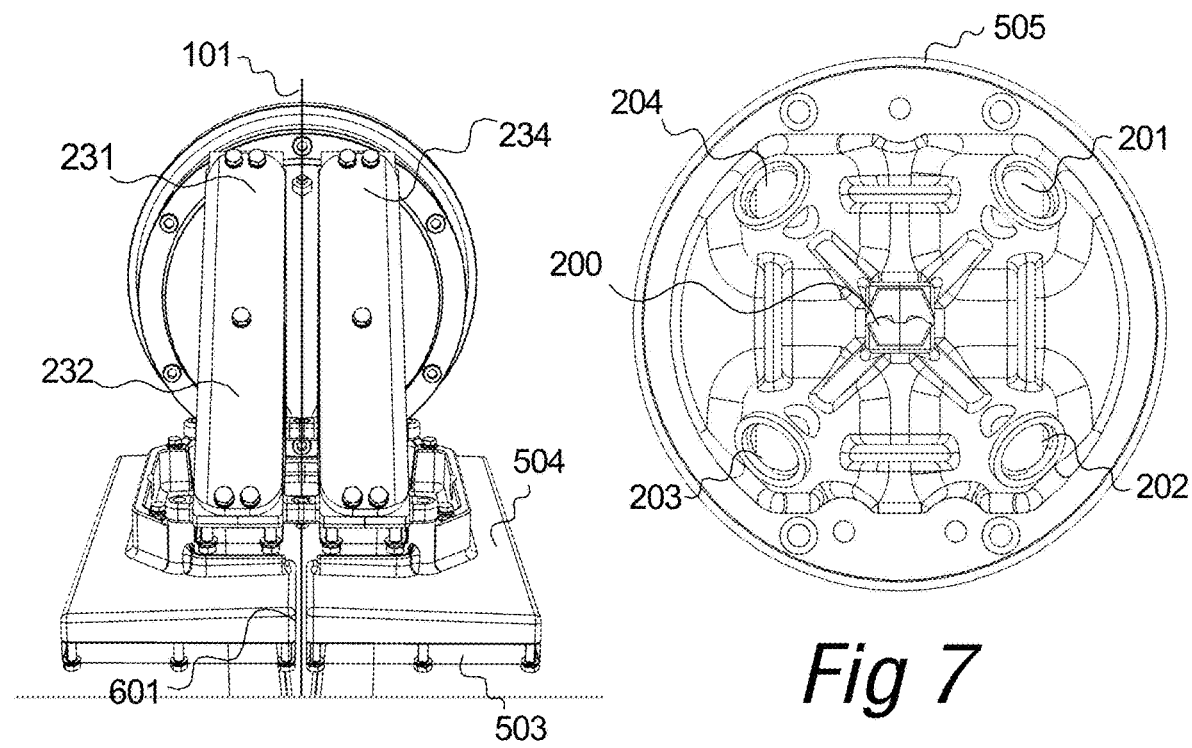
Fig 6
Fig 7

VISION APPARATUS FOR GUARDING A CUTTING BLADE

CROSS-REFERENCE TO RELATED APPLICATIONS

This application is the U.S. national phase of International Application No. PCT/NZ2022/050094 filed Jul. 13, 2022 which designated the U.S. and claims priority to NZ 778154 filed Jul. 13, 2021, the entire contents of each of which are hereby incorporated by reference.

FIELD

For cutting machines using moving or oscillating band or strap saw blades, circular blades, or the like, or for abrading machines, the invention provides safety devices capable of controlling or stopping the machine in event of optically detected proximity between an operator's hand and an unsafe area close to a blade.

DEFINITIONS

"Image Sensor" is used herein to refer to the planar semiconductor chip of a camera having on one side an array of light-sensitive sites able to detect light from an object that is preferably focused. Readout apparatus will convert the recorded image into a series of values. The chip may be fabricated using CMOS, CCD or other technologies.

"Exclusion Volume" is a volume immediately surrounding a hazard such as cutting edge or a pressing or abrading surface of a machine, and which volume may, from time to time, inadvertently include at least a part of a hand of at least one operator. In that event, the machine shall be stopped or otherwise made safe.

Names for the sets of mirrors: The Bending Set (closest to the object) is aimed at the traversing set; the Traversing Set is aimed at the directing set, and the Directing Set is aimed at the lens of the camera.

PROBLEM TO BE SOLVED

The problem is that operators of cutting equipment are likely to inadvertently receive traumatic injuries from the cutting machinery. It is desired to use a single camera to optically monitor a volume to be protected from introduction of objects, as a form of "video curtain".

For example, it is desired to provide reliable surveillance of a work station of a motor-driven band saw. The volume to be protected is defined by a series of parallel optical axis which run along vertical corners of a virtual cuboid; the exclusion volume. Entry of a hand into the inner zone triggers an immediate blade stopping process. If the hand is in the outer zone a warning signal may be sufficient.

PRIOR ART

WO2017/196187 A1 was first filed by the Applicants in 2016. For providing surveillance of a work station or band saw, an exclusion volume having vertical sides was created by using the optical axis of the view of each of four spaced-apart cameras aimed in the same direction to define the vertically directed edges of a cuboidal protected volume. Having vertical sides to the exclusion volume was convenient for the operator, in part because its boundary does not vary at different heights. See "prior-art" FIGS. 1b and 1c.

That invention had four spatially separate cameras each with a lens, providing four separated viewpoints. The viewpoints were located radially about a bandsaw blade and directed against a work table. Each camera has a field of view including an optical axis. That invention provided two options for the scanned area using control signals sent to the cameras. The image sensors of the cameras were operated in either a full-chip scan mode, or a quarter-chip scan mode in which the quarter for each camera received an image of the blade at a corresponding corner and retained a view along the optical axis, forming a corner edge of a cuboidal volume 107 that is surveilled by the four cameras. In the full scan, the inherently diverging field of view of each camera lens spread beyond the exclusion volume and provided an early-warning area. The processing system switched rapidly and often between the modes. If the exclusion zone was active, a detected object led to blade stopping. If the early-warning area was currently active, a sound or light warning is generated.

Previously, Staerzl in U.S. Pat. No. 7,924,164 had described a single-camera surveillance arrangement in which a television camera looked down on to a bandsaw table. An intensely surveilled area and an outer early-warning area within the same video frame were defined by timing logic triggered by the vertical and horizontal synchronizing pulses of a signal from the television camera according to one of the standard broadcast television protocols such as NTSC.

Both documents above relied on a colour contrast to identify a gloved hand of an operator against either the working surface or the items to be sawn.

Patent documents for protecting a user from a circular saw include U.S. Pat. No. 7,055,417 Gass, which reviewed several published hand sensor systems including contact sensing, and electric charge sensing for the saw blade with respect to its surroundings. The circular saw blade was said to stop within 20 milliseconds. But the document expected that an extremely quick response would be required after actual contact has been made.

SUMMARY OF INVENTION

In a first broad aspect, the invention provides a vision apparatus for guarding a machine that is selected from a range including bandsaws and circular saws; and protecting an operator of the machine, having hands that are optically distinguishable as by colour from a background, from injury; wherein a single camera having an image sensor and a converging or focusing lens is used with a plurality of sets of mirrors between the lens and a surveilled volume to establish a set of spaced-apart viewpoints, each of which includes an optical axis directed toward a surface, together providing a corresponding set of optical axes that define a set of corner edges of a volume having a polyhedral base upon the surface that is surveilled by the camera.

Typically, the surveilled volume encloses a working volume of a blade of a mechanically driven cutting device.

In an equivalent aspect, the invention provides vision apparatus for guarding a machine operated by a person and having a cutting blade that is selected from a range including bandsaws and circular saws; the vision apparatus having a safety controller configured to collect image data from an image sensor within a camera having a focusing lens with a common optical camera axis and initiate a physical action to prevent injury to the person if an object having a colour contrasting with a background colour is detected by the camera within a hazardous zone, wherein the apparatus uses an assembly of mirrors held in front of the lens of a single camera to reflect a contiguous plurality of bundles of light derived from a plurality of spaced-apart viewpoints covering an illuminated volume; each of which viewpoints has an optical viewpoint axis directed through the hazardous zone and toward a working surface; the optical viewpoint axes together defining a set of corner edges of a surveilled volume having a base upon the surface.

Preferably the assembly of mirrors includes a first array or set of directing mirrors disposed within a support located adjacent the lens and oriented to receive rays of light that have passed over a traversing distance toward the optical camera axis from a corresponding second array of mirrors comprising a set of traversing mirrors, and to direct said rays as a contiguous bundle along the optical camera axis and through the lens; each of said set of traversing mirrors being disposed in order to receive light from a common direction and reflect the light over the traversing distance, thereby providing each of the traversing set of mirrors with a spaced-apart viewpoint.

Preferably each set of mirrors includes a first group of four plane mirrors herein called a directing set, disposed within a support in order that each mirror, when in use, reflects into the lens of the digital camera a directed beam of traversing rays received in a centripetal direction from each mirror of a second group of four plane mirrors herein called a traversing set.

Optionally a third array or bending set of mirrors is disposed in order to reflect rays arriving from a different direction into the common direction so that, when in use, the camera may be displaced from a central position in conflict with the cutting blade.

Preferably all the mirrors are plane mirrors mounted at an angle of 45 degrees relative to both the incoming and reflected rays of light.

In particular, the surveilled exclusion volume is defined along four corner edges by four viewpoint axes carrying four bundles of rays of light arising from use of four mirrors in each set of mirrors.

Preferably, all of the set of optical axes share a parallel direction, and the surveilled volume has a shape of a cuboid.

Preferably, the overall intention of the present invention is to determine when any operator's hand, wrapped in a glove of a distinctive colour, is too close to the moving blade. Preferably an inner, danger zone and an outer, warning zone are created.

In a second broad aspect the controller is a digital computer or equivalent, configured to operate alternately in a first mode in which that part of the image sensor within a quadrilateral delimited by the positions of the four optical axes projected on to the image sensor is defined as covering the interior of the surveilled volume and is read out from the camera to the controller, and any instance of an object having the colour contrasting with the background colour is treated as an event requiring the cutting blade to be stopped, or in a second mode in which all parts of the image sensor are read out in order to find any instance of an object having the object colour treated as an event requiring a warning to be made.

In a related aspect, a beam of rays from each optical axis is relayed through the assembly of mirrors on to the image sensor and arrives at a corresponding and non-overlapping position on the image sensor, between a centre and a corner of the image sensor.

PREFERRED EMBODIMENT

The description of the invention provided herein is given purely by way of example and is not to be taken in any way as limiting the scope or extent of the invention. In particular references to a "bandsaw" or a "circular saw" are made by way of example only, in order to illustrate the invention, which is applicable to other manually fed cutting or abrading machinery or to protective security. The invention has been described in an illustrative manner, and it is to be understood that the terminology which has been used is intended to be in the nature of words of description rather than of limitation.

Throughout this specification unless the text requires otherwise, the word "comprise" and variations such as "comprising" or "comprises" will be understood to imply the inclusion of a stated integer or step or group of integers or steps but not the exclusion of any other integer or step or group of integers or steps. Each document, reference, patent application or patent cited in this text is expressly incorporated herein in its entirety by reference.

Reference to cited material or information cited in the text should not be understood as a concession that the material or information was part of the common general knowledge or was known in New Zealand or in any other country.

LIST OF DRAWINGS

(FIG. 1a of the Prior Art is not included.)

FIG. 5 is a side-front view of the mirror assembly, camera, and lamp.

FIG. 6 is a view of the assembled invention as seen from the side opposite the camera.

FIG. 7 is a view of the traversing mirror sub-assembly at the side that receives the camera; cover removed.

INTRODUCTION

The invention is a video surveillance apparatus devised to protect operators' hands when a cutting or abrading machine is in use. A protected bandsaw and a protected circular saw are described as examples. This invention is intended to provide at least one signal in response to optical detection of said hand or hands in a wrong place. That signal is used to cause the machine to immediately take appropriate actions; the actions being described elsewhere.

Figure 1B:
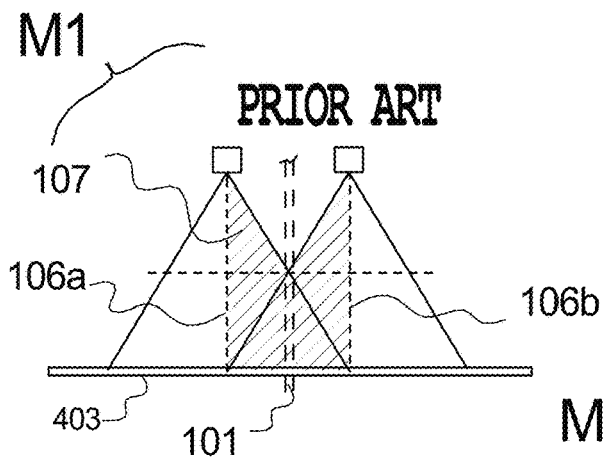
FIG. 1b (Prior Art) shows the shaded exclusion zone of the Applicants' earlier invention when in mode M1.
Figure 1C:
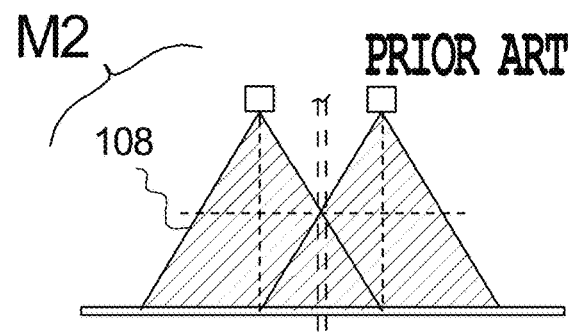
FIG. 1c (Prior Art) shows the early-warning zone as a shaded area when in mode M2.

This Application is based on prior art apparatus here shown diagrammatically in FIGS. 1b and 1c, copied from the Applicant's WO2017/196187. Here, two of the four cameras are shown as black boxes at the apex of each of two triangular shapes sitting on a table 403. Each triangle is bisected by a dashed line, which is the optical axis of the camera with lens above, at the midline. The bandsaw blade 110 is shown as the close pair of vertical dashed lines. In this prior-art example, an exclusion cuboid 107 (the hatched volume) with vertical edges 106a and 106b (indicia added for this document) is created when each of the cameras is set to scan a quarter only of its image sensor, with one corner edge of the cuboid placed directly below each camera. That scan mode was called "M1" and the term will be retained herein. In M1, detection of a coloured glove or object causes the bandsaw blade to halt. In a second mode called "M2", each camera is frequently switched to scan the entire available area so that the surveilled area 108, which is used as "an early warning system", extends further from all sides of the cutting blade than the cuboidal exclusion zone. An alarm may be sounded. In the present invention, an exclusion cuboid like that shown in prior-art FIG. 1b is generated using a single camera and sets of mirrors that provide four bundles of rays entering the supporting head that holds the mirrors and the camera with lens. Each bundle includes a central axis that defines a corner edge of an exclusion cuboid. Each central axis may be thought of as arising from a separate diagonal corner (305, 306, 307 or 308) of a selected central portion of the image sensor of the camera. Together the four central axes of the four beams define the M1 exclusion cuboid of this invention, for which, vertical sides may be maintained.

EXAMPLE 1. Bandsaw

The present application uses only one digital or machine-vision camera 501, not four cameras, to surveil an exclusion volume and optionally a surrounding volume. Four individual viewpoints of the working volume and four separate optical axes, one for each bundle of rays are maintained using a chain of mirrors to combine four views of the workspace into a single, four-part view which is brought to focus on the image sensor by a converging lens 502. Although any number of separate ray paths could be used, it is convenient to have four folded bundles of light rays as described in this document.

The camera is mounted with its lens in proximity to an assembly of mirrors, the "directing set" placed in line with an optical axis of the camera. Each mirror of the directing set (201, 202, 203, and 204) receives a bundle of rays from a corresponding mirror of a "traversing set" of mirrors (221, 222, 223 and 224) over a traversing distance. The directing set then deflects the rays through 90 degrees, and forwards the rays toward the camera as one of a group of contiguous ray bundles. The "bending set" (mirrors 231, 232, 233 and 234) is used to catch light from objects upon the work table and reflect bundles of rays to one side of the blade and toward the traversing set of mirrors.

Please note that the tapered appearance of the bundles of rays in FIGS. 2, 4a, 4b and 5 is not a perspective effect; it shows that the camera lens inherently collects a cone diverging from the region of the lens. An angle of taper is determined by the focal length and by the dimensions of the focused image. A useful aspect of the present invention is that it overcomes the diverging cone effect of a plain single-camera surveillance solution, by creating four central axes; one inside each of the four bundles of beams and the axes may be made parallel and vertical. Please also see FIGS. 5, 6 and 7.

All mirrors are typically but not necessarily used at 45 degree angles to the rays, so that the bundles are reflected through a 90 degrees angle at each mirror. Preferred mirrors are plane mirrors. Mirrors may have a curved surface, such as a convex cylindrical surface in order to lengthen the viewed volume. Each optically finished surface is "front-silvered" in order to avoid secondary reflections from an overlying glass surface, using a process for depositing a reflective layer of aluminium, silver or other metal on to a prepared surface, optionally followed by one or more protective or reflectance-enhancing layers of selected transparent materials. A gold coating may be preferred for inertness and will tend to darken blue objects. Mirror surfaces may receive a dichroic coating in order to enhance a colour contrast between objects and work material. The diagrams show some mirrors as discrete discs, as obtained for the prototype.

The length and width of any mirror is established once the angle of the taper of the cone of light between a point of origin at the camera and a base is known, and if the distance from the point of origin to the mean mirror position is known, and if the angle at which the mirror intercepts the cone of light is known. Preferably each mirror is made a little larger in order to provide for edge defects, mounting claws, and placement errors.

Figure 2:
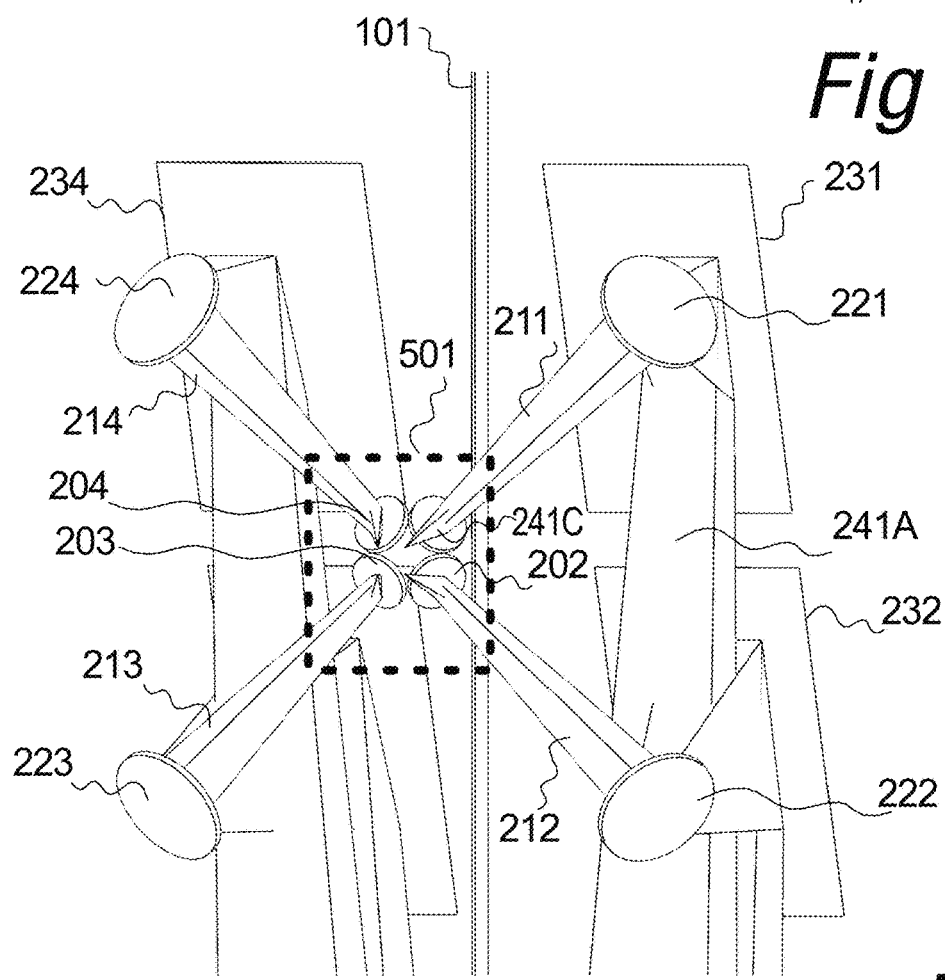
FIG. 2 is a schematic showing the paths of rays of light through the mirrors.

FIG. 2 shows the mirror assembly with the traversing set of mirrors (221, 222, 223 and 224) in front. An example of a traversing distance is shown by the ray path 211 shown in FIG. 2, which path has a length about equal to half the spatial separation of opposite viewpoints, placed diagonally across the exclusion volume. Other traversing ray paths are 212, 213 and 214. Opposite viewpoints are determined by placement of mirrors 231, 232, 233 and 234 known as the bending set, because a separate corner edge of the exclusion cuboid (also one of the four optical axes) extends to each of the bending mirrors. The final section is better shown in FIG. 4b which is a closer view of the "camera end" of the bundles of rays, and drawn as seen from the opposite side.

241A shows one of four incoming bundles of rays. After reflection by bending mirror 231, that bundle now identified as 241B passes to mirror 221 to be reflected inward as bundle 241C, toward an optical camera axis (not shown) shared by the camera 501 and lens 502. Bundle 241C is then reflected for a last time by mirror 202 (seen as an edge) along one side of the camera axis and into the lens 502. An optical axis for each of the four bundles is created by scanning a central area of the image sensor and is employed to define a corresponding corner edge of the exclusion cuboid.

The positions of the bending set of mirrors (231, 232, 233 and 234) define the four viewpoints of the bandsaw surveillance apparatus and hence the overall scale of the protected volume. For a circular saw, the positions of the traversing set of mirrors would define the viewpoints. An example preferred distance from the blade for each viewpoint axis is 70 mm, as mapped on the work table. That distance is influenced, for example, by the size of the machine and the desired size of the cuboidal shape that is the exclusion volume. The virtual central axes of each of the bundles of rays from the viewpoints on to the work table are preferably parallel with each other, so that the optical axis carried within each bundle of rays is parallel with the other optical axes and the boundaries, the corner edges, of the exclusion zone are vertical. The inventors expect that a bandsaw operator will find it relatively convenient to use a square-based exclusion volume, symmetrically placed about the blade and with vertical sides. That allows the operator to best appreciate the position of the exclusion volume so that her or his hands do not stray and make the machine perform an immediate stop. The mirrors of the surveillance apparatus may be selected, placed or tilted to give other patterns of coverage while remaining consistent with the principles of this invention.

Figure 4A:
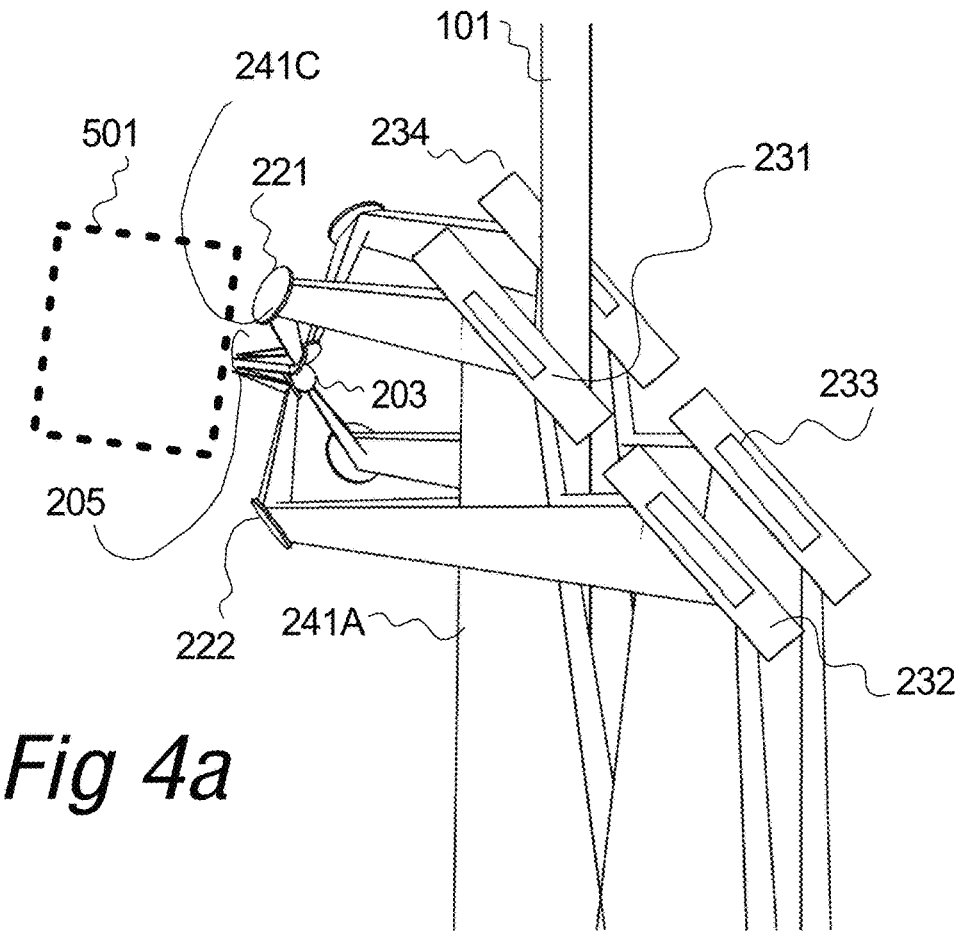
FIG. 4a is an oblique side view of the mirror assembly and camera about a bandsaw blade, showing the paths of rays of light through the mirrors.
Figure 4B:
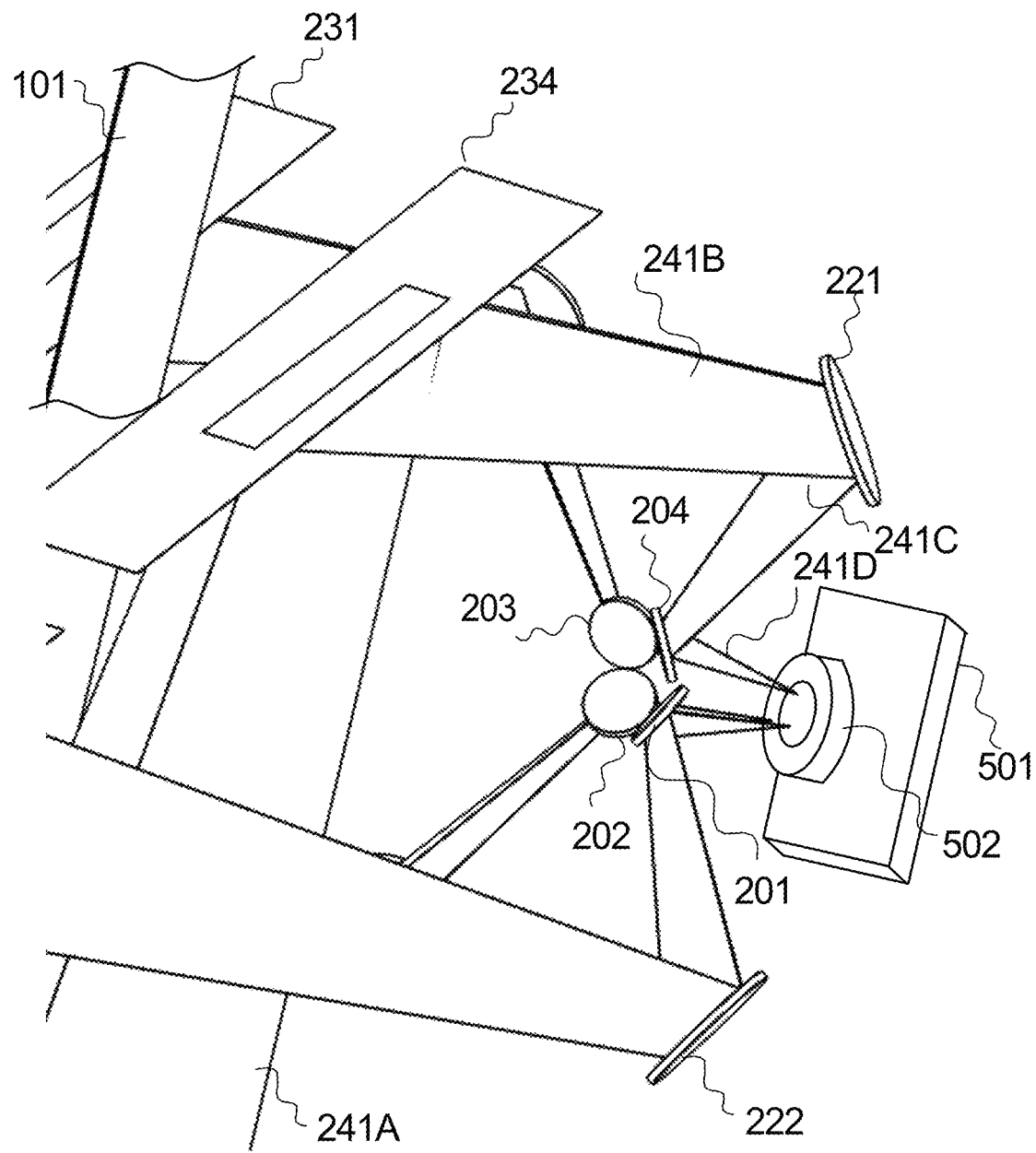
FIG. 4b shows details of the directing set of mirrors, and the lens of the camera.

Optional bending mirror 231 and its cohorts reflect the rays sideways so that the radially symmetrical optical system is conveniently displaced to one side of the bandsaw blade 101. In Example 2, where the cutting object is a circular saw blade, that set of bending mirrors may be deleted. Then, traversing mirror 221 and its cohorts (222, 223 and 224) reflect each bundle of rays inwardly toward the optical axis of the camera, if produced. Finally, directing mirror 202 and its cohorts 203, 204 and 205 reflect the bundles through 45 degrees against the lens 502. The lens focuses the rays in all the bundles, which are contiguous though not superimposed, on to the image sensor of the camera 501 so that objects in the exclusion zone adjacent the bandsaw blade are in focus. Superimposition of bundles would reduce the contrast available and might lead to false responses by the controller. In FIG. 4*b*, two bundles of rays that would have obscured bundle 241D have been deleted for clarity.

Light is produced from sources conveniently attached to the supporting head; for example an array of white light-emitting diodes 503 located inside a clear plastics housing under a base of the housing 500 and providing typically 1500 lumens of relatively shadow-free light over the work surface although, since the camera lens 502 is preferably used with a wide aperture, too much light may be a possibility and pixel saturation should be avoided. The light is reflected from objects upon the saw table. Some enters into the housing as bundles of rays through windows of plane glass which serve as windows to exclude contamination. Lighting helps the operator see the working area well, and there is little noise in the signals from the camera despite loss of some light from several reflections.

Inside housing 500, incoming light bundles are reflected by the bending set of mirrors (231, 232, 233 and 234) through 90 degrees toward the rear of the band saw, with respect to an operator's position at the front, by either single mirrors or a pair on each side. The bending set of mirrors are located inside the slanted housings labelled 231, 232 in FIG. 5. The mirrors also define the corner edges of the exclusion zone beneath the housing 500. Each corner edge is placed at a selected angle: one of 45, 135, 225 and 315 degrees with reference to a rearward direction along a line extending from the blade teeth, through the longer dimension of the flattened blade 101 and over the table.

The housing includes a groove 601 built into the viewing head that passes between mirrors 232 and 233 that admits the bandsaw blade 101. See FIG. 6. The light, as bundles of rays, is then caught and reflected by one of four tilted mirrors (the traversing set) toward a central axis of the housing which is a continuation of the optical axis of the camera 501 and lens 502.

The diagram FIG. 4*b* best shows the path of one bundle (241A-D) of the four. Light from the work table is received through a window (not shown and hits bending mirror 234, which first defines a limit on the cross-section of the bundle of rays. Reflected rays, identified as 241B pass on to the traversing mirror 221 which reflects the rays as traversing bundle 241C toward the directing mirror 204 which reflects the bundle as 241D into the lens 502 of the camera 501. The length of bundle 241C, doubled, is approximately the spacing between diagonally opposite viewpoints. As previously mentioned, an example traversing distance is 70 mm giving about 140-145 mm diagonal corner-to-corner distance as mapped on the work table for the exclusion cuboid. Other items shown in FIG. 4*b* are part of the bandsaw blade 101, bending mirror 231, traversing mirror 222 and the other directing mirrors (201, 202 and 203) that direct the sideways bundles along their optical paths into a contiguous but not overlapping set of parallel, separate bundles into the lens 502. Preferred converging (positive) camera lenses are typically about 8 mm focal length and are operated with a large aperture in order to not obstruct the outer edges of the contiguous beams. Depth of field effects on focusing or sharpness have not been a problem.

The directing set of mirrors is located along the central axis in order to intercept each traversing beam and reflect it toward the camera lens as one of four contiguous beams. The directing set (201, 202, 203, and 204) may be made a single quadrilateral pyramid formed upon an end of a rod, with four mirror facets at 90 degree angles to each other and each at 45 degrees inclination to a central axis. Adjoining facets would minimize obscuration of the four contiguous beams at this assembly. The facets are disposed in order to direct the sideways optical paths into a set of parallel, contiguous but separate optical paths to be received into the lens of the camera.

Figure 3:
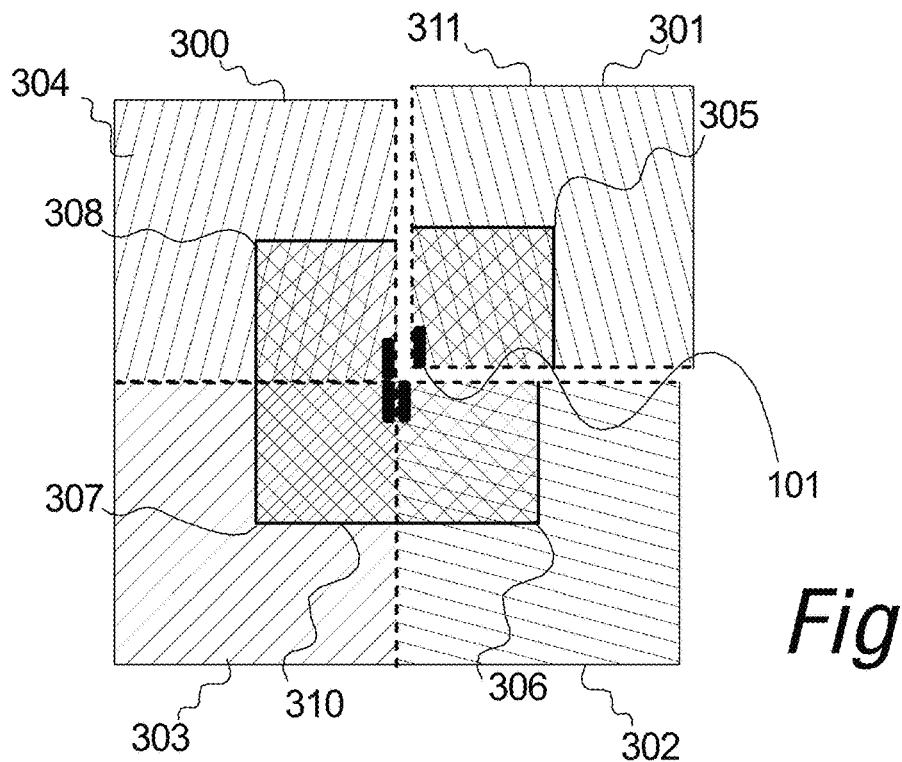
FIG. 3 is a schematic of the images as projected onto the image sensor of the camera.

The camera, through its lens, sees four different images of the objects under scrutiny upon its image sensor. Each of the four is located in one sector of the image sensor. FIG. 3 is a diagram showing a schematic of the image array laid on to the image sensor. 300 indicates an edge of the functional part of the typically square image sensor chip. The chip is functionally divided by camera scanning instructions into two parts. One part includes the outer four quadrants 301, 302, 303 and 304. Quadrant 301 has been shifted slightly for clarity. Each quadrant receives a focused image corresponding to one of the four viewpoints as shown in FIG. 2, after passage through the assembly of mirrors. The spaced-apart viewpoints are located at each of four angles of rotation about an axis of the bandsaw. One of the four images of the bandsaw blade is shown as 101 in FIG. 3.

The position of the optical axis of each bundle where it is projected on to the image sensor is shown at the corners 305, 306, 307 and 308 respectively of four inner quadrants which are defined by scanning instructions sent to the camera. After sideways translation through the sets of mirrors, one camera appears to have four separate optical axes. When mapped onto the camera CCD each optical axis 305, 306, 307 and 308 defines a preferably vertical corner edge of a protected or exclusion cuboid.

The image sensor receives four real images. They do not overlap although there may be some blurring of the boundary between different parts of the entire set of images.

Supporting Head.

Details of an example supporting structure or that houses the mirrors and camera are shown in FIGS. 5, 6 and 7. Since light is collected from all quadrants surrounding and centered on the blade, an axial slot 601 is provided to surround the bandsaw blade. Plane glass or equivalent windows protect the mirrors from contamination during use. The viewing head containing the assemblies of mirrors is sealed to maintain a dry atmosphere. The housing is sealed at one end by the windows and at the other end by the attached camera and lens. Preferably its interior is blackened, to minimize stray light.

It will be appreciated that the assembly shown in FIGS. 5 and 6, comprising a lamp, a mirror assembly inside a housing and a camera, may be modular and can be replaced as a unit should any of its components fail.

The exclusion volume has a physical base comprising a lower boundary such as a plinth, or a bandsaw cutting table. It will be realized that because of the diverging cone of each lens, merging of each of the four rays as shown in FIG. 4 would take place at a distance if the table was absent. Most of the exclusion volume that is not occupied by the diverging light rays is obscured within the supporting head, or by components of the bandsaw, or is well above the working area, so it is unlikely that an operator will receive injury within that volume.

An air jet apparatus (not shown) is preferably installed when the invention is used on a bandsaw, and may be used to clean the windows (not shown) to remove dust and splatter when required.

Controller

The bandsaw has a computer-based controller (which may comprise a programmable gate array, a generalized microprocessor, a conventional processor, a graphics processor, or a dedicated custom chip) that receives a digitized video input from the camera. The controller includes a "self-test" procedure that ensures that the camera works properly and can resolve the entire area; ensuring that none of the mirrors or windows are obscured. The controller would prevent the bandsaw being started if the self-test procedure failed.

Each quadrant as shown in FIG. 3 is designated by programming as a high-priority inner area (such as 308) surrounded by a lower-priority outer area 304, as shown with denser hatching.

That allows the safety apparatus to treat the outer area and hence a volume of space above the bandsaw table as a warning zone under mode M2, for which detection of a glove having a contrasting colour (such as blue or green) is followed by sounding an audible or other alarm. The high-priority inner area under mode M1 is preserved so that detection of a glove in that part is immediately followed by physical actions causing the cutting blade to halt.

The inventors have previously established ways, usable with this invention, to halt a bandsaw blade within about 20 milliseconds without exposing the blade to forces causing failure. It should be emphasized that the present invention reacts to an observed proximity of hand and cutter, rather than actual electrical contact between the hand (usually covered by an electrically conductive glove in the prior art) and the cutting blade, which is safer and allows more time to bring the blade to a halt.

During operation in Mode 1, the camera is instructed by the controller to scan only the central quarter of the entire surface of the image sensor. That catches the contents of the exclusion cuboid and extends as far as the vertical corner edges of the cuboid. In Mode 1, adjacent quarters of all four ray bundles are scanned together. The controller examines the signal, pixel group by pixel group, for any transgression by an object recognizable by colour contrast, such as a blue or green-gloved hand against meat, or a red-gloved hand against wood. Preferably the "chroma" content of each pixel or group—i.e. colour separated from intensity—is analysed and if enough contiguous pixels are counted (a "contiguous coloured pixel count") as being distinctively coloured, the controller will issue an "Immediate Halt" instruction to the controller. Artefacts may be controlled by for instance filtering or binnng, or by checking that an object persists in more than one scan. Brightness contrast rather than colour contrast may be used, such as if the gloves are made of a fluorescing material During operation in Mode 2 the camera is instructed to scan all of the image sensor, perhaps using binning to reduce the quantity of information. That includes the contents of the exclusion cuboid and also extends as far as the outer edges of the volumes viewed by the lenses. The controller acts as described in the preceding paragraph. If the contiguous coloured pixel count or equivalent exceeds an established constant, the controller will issue a "Make the Warning" instruction which creates an audible or other warning but does not halt the blade. The controller switches between Mode 1 and Mode 2 perhaps 100 times a second. An approaching hand will receive the warning under Mode 2 first. In some options the controller might operate in a single mode.

Preferred types of camera may be pre-programmed to scan part or all of the image sensor on receipt of a simple command. Alternatively, review of either part or all of the image sensor chip can be done within a memory of the controller so that the camera can have reduced specifications.

A currently preferred option for the camera is: "Teledyne FLIR Blackfly S USB3" Model: BFS-U3-04S2C-CS: FLIR Systems UK; 2 Kings Hill Avenue—Kings Hill, West Malling, Kent ME19 4AQ, United Kingdom. That camera uses a 630×630 pixel array on a square image sensor that is about 0.8 cm long on a side. It can be operated at 522 frames per second although used at 320 frames per second in the prototype example. Assuming Modes 1 and 2 are applied alternately, fresh Mode 1 data will be supplied to the controller at from 4 to 6 millisecond intervals. The Applicants have previously determined that a 20 millisecond total response time for a bandsaw was adequate when hand proximity, not contact is the first detected event.

EXAMPLE 2: circular saw

This Example describes an optical security surveillance device adapted from Example 1 and used for rendering a circular saw blade safe by creating an exclusion zone around the blade. The shape and dimensions of the exclusion cuboid may differ from Example 1. As for Example 1, a graded response may be created. If a person or part thereof is detected near the exclusion zone within Mode 2 an alarm is raised. Once the exclusion zone is entered in Mode 1 the blade is arrested.

Figure 8:
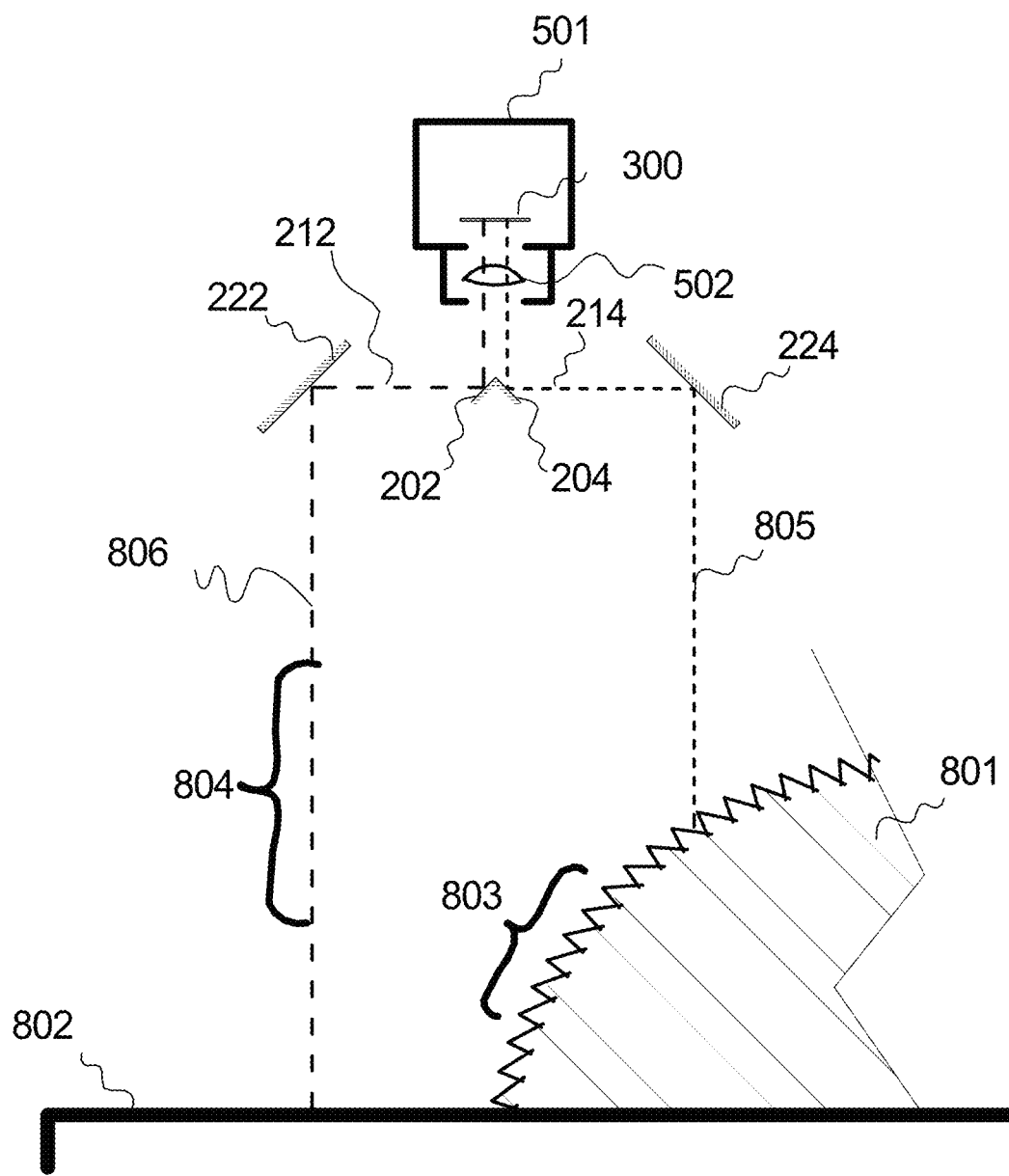
FIG. 8 is a side elevation diagram of a protected circular saw machine.

FIG. 8 is a vertical cross-section to show how the invention is adapted for providing surveillance within an exclusion volume 804 for a circular saw 801 on a table 802. The bending set of four mirrors are not necessary since the teeth 803 of the cutting device (here rotated by 45 degrees) become displaced to one side of the position of the camera 501 and lens 502. Line 806 indicates the axis of a first bundle of rays passing from part of a table 802 to be reflected by traversing mirror 222 toward directing mirror 202, while line 804 shows an axis of an opposite bundle of rays reflected by traversing mirror 224 and via directing mirror 204; through the focusing lens 502 of the camera 501 and on to the image sensor 300. Two other bundles, as in Example 1, are preferably present but have not been captured in this cross-section.

A surface view of this table would show a square base for the exclusion cuboid. In order to elongate the exclusion cuboid along the place of the saw disk, the traversing mirrors may have a convex cylindrical surface at 45 degrees to a width or length of each mirror, so that the ray bundles are spread out along one axis, or the lens 502 may be fitted with a cylindrical lens attachment. Alternatively a camera having a non-square image sensor may be used.

The controller and the camera work together as for Example 1 to search for contiguous pixels having a contrasting colour or brightness to that of the background, within the area covered in the current Mode, and take an action appropriate to that Mode.

It will be appreciated that this Example provides a way to protect a user of a circular saw by optically sensing a state of proximity rather than by requiring electrical contact be made between the blade and a conductive glove. The angular momentum of a spinning circular saw is difficult to dissipate if nearly instant (1-2 milliseconds) stopping is required, while having about 20 to 100 milliseconds to bring the blade to a stop allows more conservative measures.

A circular saw could be protected with a two-beam system although four beams provides an exclusion zone with defined borders all around.

Variations.

Some or all of the mirrors could be replaced by prisms.

Please note that a rectilinear design as described could be replaced by one not using 45 degree angled mirrors and perpendicular optical axes without detracting from the invention.

Non-planar or curved mirrors may be used.

Concerning bandsaw braking systems, the multiple mirror invention is seen as a way to make simpler, lighter bandsaws suitable for use in environments other than heavy-duty use in meat packing plants, such as in retail shops. Therefore a less immediate bandsaw stopping mechanism than the Applicants' previously described process including a step of decoupling the blade from the wheels that had supported the blade in tension when working, and a second step of applying brakes directly to the blade may be used. The moving parts may be halted by applying brakes to the blade alone, and power to the motor would be cut. A motor including a brake activated on cutting the power may also be used.

Advantages.

This approach uses only one camera and one lens, instead of the multiple sets used in the Applicants' earlier solutions to the problem.

The present invention overcomes the diverging cone effect of a plain single-camera with lens and only one optical axis when used to surveil a volume, by simulating four optical axes; one for each of the four bundles of beams, and those four axes may be made parallel.

There is no need for high speed data handling, such as a hub to bring four different camera inputs into one channel.

Processing speed remains high, given high frame-rate machine-vision cameras and a direct approach to recognizing a contrasting colour in a specified volume.

The mirror arrangement has the effect of adding more folds to the optical path, so that the optical installation for a relatively long-focus lens becomes more compact.

The subassembly including the traversing and directing mirror sets may be used in applications other than protection of hands from cutting machines, such as protection of items in exhibits.

Finally it will be understood that the scope of this invention as described and/or illustrated herein is not limited to the specified embodiment. Those of skill will appreciate that various modifications, additions, known equivalents, and substitutions are possible without departing from the scope and spirit of the invention as set forth in the following claims.

We claim:

1. A vision apparatus for guarding a machine when operated by a person and having a cutting blade; the vision apparatus having a controller configured to collect image data from an image sensor within a camera having a focusing lens sharing a common optical camera axis and initiate a physical action to prevent injury to the person if an object having a color contrasting with a background color is detected by the camera within a hazardous zone, wherein the apparatus uses an assembly of mirrors held in front of the lens of a single camera to reflect a contiguous plurality of bundles of light derived from a plurality of spaced-apart viewpoints covering an illuminated volume; each of which viewpoints has an optical viewpoint axis directed through the hazardous zone and toward a working surface; the optical viewpoint axes together defining a set of corner edges of a surveilled volume having a base upon the surface.

2. The vision apparatus as claimed in claim 1, wherein the machine is a bandsaw and the physical action is initiated before the object comes into contact with the blade.

3. The vision apparatus as claimed in claim 1, wherein the machine is a circular saw and the physical action is initiated before the object comes into contact with the blade.

4. The vision apparatus as claimed in claim 1, wherein the assembly of mirrors includes a first array or set of directing mirrors located adjacent the lens and oriented to receive rays of light that have passed over a traversing distance toward the optical camera axis from a cooperating second array of mirrors comprising a set of traversing mirrors, and to direct said rays as a contiguous bundle along the optical camera axis and through the lens; each of said set of traversing mirrors being disposed in order to receive light from a common direction and reflect the light over the traversing distance, thereby providing each of the traversing set of mirrors with a spaced-apart viewpoint.

5. The vision apparatus as claimed in claim 4, wherein a third array or bending set of mirrors is oriented in order to reflect rays arriving from a different direction into the common direction so that, when in use, the camera may be displaced from a central position if in conflict with the cutting blade.

6. The vision apparatus as claimed in claim 4, wherein all the mirrors are plane mirrors mounted at an angle of 45 degrees relative to both the incoming and reflected rays of light.

7. The vision apparatus as claimed in claim 1, wherein the surveilled exclusion volume is defined along four corner edges by four viewpoint axes arising from use of four mirrors in each set of mirrors.

8. The vision apparatus as claimed in claim 7, wherein all of the set of optical axes share a parallel direction, and the surveilled volume has a shape of a cuboid.

9. The vision apparatus as claimed in claim 1, wherein the controller is a digital computer or equivalent, configured to operate alternately in a first mode in which that part of the image sensor within a quadrilateral delimited by the positions of the four optical axes projected on to the image sensor is defined as covering the interior of the surveilled volume and is read out from the camera to the controller, and any instance of an object having the color contrasting with the background color is treated as an event requiring the cutting blade to be stopped, or in a second mode in which all parts of the image sensor are read out in order to find any instance of an object having the object color treated as an event requiring a warning to be made.

10. The vision apparatus as claimed in claim 5, wherein all the mirrors are plane mirrors mounted at an angle of 45 degrees relative to both the incoming and reflected rays of light.

* * * * *